United States Patent [19]

Hopewell

[11] Patent Number: 5,315,832
[45] Date of Patent: May 31, 1994

[54] PROCESS FOR THE RECOVERY OF A LIGHT HYDROCARBON FRACTION FROM MARINE LOADING OPERATIONS

[75] Inventor: Richard B. Hopewell, Medfield, Mass.

[73] Assignee: Process System International, Inc., Westborough, Mass.

[21] Appl. No.: 17,695

[22] Filed: Feb. 12, 1993

[51] Int. Cl.$^5$ ............................................... F25J 3/00
[52] U.S. Cl. ........................................... 62/20; 62/27
[58] Field of Search ........................ 62/17, 20, 24, 27

[56] References Cited

U.S. PATENT DOCUMENTS

| Re. 32,600 | 2/1988 | Ryan et al. | 62/17 |
|---|---|---|---|
| 3,676,981 | 2/1971 | Afdahl et al. | 55/30 |
| 3,967,938 | 7/1976 | Daeschler et al. | 55/30 |
| 3,994,074 | 11/1976 | Lowther | 34/12 |
| 4,273,562 | 6/1981 | Niskanen | 55/52 |
| 4,294,590 | 10/1981 | Linde et al. | 62/17 |
| 4,383,842 | 5/1983 | O'Brien | 62/20 |
| 4,459,142 | 7/1984 | Goddin et al. | 62/20 |
| 4,707,270 | 11/1987 | Ayres et al. | 62/24 |
| 4,707,996 | 11/1987 | Vobach | 62/114 |
| 4,720,293 | 1/1988 | Rowles et al. | 62/24 |
| 4,720,294 | 1/1988 | Lucadamo et al. | 62/21 |
| 4,752,306 | 6/1988 | Henriksen | 55/38 |
| 4,762,543 | 8/1988 | Pantermuehl et al. | 62/28 |
| 4,948,394 | 8/1990 | Rojey | 55/48 |

*Primary Examiner*—Ronald C. Capossela
*Attorney, Agent, or Firm*—Richard P. Crowley

[57] ABSTRACT

The process for the recovery of light hydrocarbon fractions from off-gases derived from the transfer of petroleum material, particularly from a marine loading operation. One process comprises introducing the off-gases containing a light hydrocarbon fraction to be recovered into a refrigerated absorbent column through a liquid ring compressor, employing as a motive fluid a heavy hydrocarbon fraction, recovering a bottom stream from the absorber column having the heavy oil and the light hydrocarbon fraction, then venting an overhead air stream with a low total hydrocarbon content. The process also includes an integrated process for the recovery of light hydrocarbon fractions from off-gases and includes, in addition to a refrigerated absorber column, a recovery stripper column for the removal of the light hydrocarbon fraction from the bottom liquid of the absorber column and the recovery and recycling of a heavy hydrocarbon fraction for use in the absorber column and with the liquid ring compressor. The return of non-condensibles to the liquid ring compressor, both the absorber and the absorber recovery process systems provide for an efficient, low-cost and effective process for the recovery of light hydrocarbon fraction from marine off-gases.

17 Claims, 2 Drawing Sheets

PROCESS FOR THE RECOVERY OF A LIGHT HYDROCARBON FRACTION FROM MARINE LOADING OPERATIONS

BACKGROUND OF THE INVENTION

In the transfer of petroleum materials, such as in marine transfer operations between ships and barges and onshore facilities, there are often discharged off-gases which contain environmentally unacceptable amounts of a light hydrocarbon fraction. It is desirable to reduce the amount of light hydrocarbon fractions in discharge off-gasses, both for environmental concerns and for the economic value of the recovery of the light hydrocarbon fractions.

Generally, a particulate-containing adsorbent type column, such as activated carbon columns, are employed in marine transfer operations to adsorb the light hydrocarbon fraction vapors. However, difficulties do occur when large off-gas and light hydrocarbon vapor amounts are present, such as in marine loading and unloading operations, due to the volume of the light hydrocarbon fraction discharge and the rapid adsorption of the light hydrocarbon and the need to regenerate such columns frequently. Thus in marine petroleum transfer operations, the employment of activated carbon or other particulate-type adsorbent columns to recover a light hydrocarbon fraction from the off-gases, is often a complex, cumbersome and expensive recovery operation, which involves the frequent desorption of the activated carbon by heating or by the employment of large vacuum pumps.

It is therefore desirable to provide a new, improved, efficient integrated process for the recovery of a light hydrocarbon fraction, particularly from marine loading operations and to provide for the discharge of gases having an environmentally acceptable amount of the light hydrocarbon fraction.

SUMMARY OF THE INVENTION

The invention relates to a process for the recovery of light hydrocarbon fractions from off-gases derived from the transfer of petroleum materials, particularly marine transfer operations.

The invention is directed to a process employing a refrigerated heavy hydrocarbon fraction absorption process for the recovery of light hydrocarbon fractions from the off-gas vapor from marine transfer operations. In particular, the integrated process employs a heavy hydrocarbon fraction such as a heavy oil for the motive fluid in a liquid ring compressor for the off-gases and also as an absorbent fluid in a refrigerated absorbent column. The absorbed light hydrocarbon fractions are stripped from the heavy hydrocarbon fractions and recovered as salable products. The heavy hydrocarbon fractions, or heavy oil, are recycled, the off-gases, containing low, environmentally acceptable amounts of hydrocarbons, are then discharged into the atmosphere, and the absorbed light hydrocarbon fraction is recovered.

The invention relates to the employment of a refrigerated absorption process wherein the heavy hydrocarbon fraction is supplied separately, such as from an adjacent refinery or process plant, and then returned to the refinery or process plant containing the absorbed light-hydrocarbon fraction and also a fully integrated process employing both an absorption and recovery column, wherein the heavy hydrocarbon fraction is recovered in the recovery column and recycled for use in the absorption column and process.

In one embodiment, the process is directed to the recovery of a light hydrocarbon fraction from off-gases derived from the transfer of petroleum materials, particularly marine transfer operations, and which process comprises introducing the off-gas containing a light hydrocarbon fraction into a liquid ring compressor, which employs a heavy hydrocarbon fraction as a motive fluid in the liquid ring compressor. The process includes withdrawing a vapor-liquid effluent mixture from the liquid ring compressor, separating the vapor from the liquid effluent, with the liquid then enriched in the light-hydrocarbon fraction to be recovered. The process includes recirculating a major portion of the separated liquid effluent to the liquid ring compressor for re-use and introducing the separated vapor with the reduced light hydrocarbon fraction into the lower portion of a refrigerated absorber column containing mass transfer devices such as distillation-type trays, loose distillation-type packing or structured distillation type packing therein.

The process includes introducing a heavy hydrocarbon fraction, such as a heavy oil, to an overhead condenser or an upper portion, for example, the upper 20% of the refrigerated absorbent column, for the absorption of the light hydrocarbon fraction from said separated vapor. The process includes discharging from said refrigerated absorption column an overhead vapor stream which is reduced in total hydrocarbon content and substantially environmentally acceptable for atmospheric discharge, such as an overhead vapor stream which comprises air or nitrogen with less than about 1 percent, for example 0.3–0.5% by volume total hydrocarbon content. The process includes withdrawing from said refrigerated absorbent column a bottom stream which comprises the heavy hydrocarbon fraction and the recovered absorbed light hydrocarbon fraction, which bottom streams may then be returned to an adjacent refinery or process plant from which the heavy hydrocarbon fraction is derived or sent to a recovery column for recycling in an integrated process.

In another embodiment, the process of the invention includes an integrated recycle process which includes introducing the separator liquid purge stream and the liquid effluent derived from the refrigerated absorption column into a separate recovery distillation column, withdrawing a light hydrocarbon fraction overhead stream, withdrawing a non-condensible vent stream from said recovery column, and recycling the vent stream to the liquid ring compressor. The process includes withdrawing a heavy hydrocarbon bottom stream essentially free of the light hydrocarbon fraction and adapted for recycle and use to the liquid ring compressor and/or to the refrigerated absorbent column, providing an integrated recycle process for the recovery of a light hydrocarbon fraction from the off-gases derived from the transfer of petroleum materials.

Typical petroleum materials encountered in petroleum transfer operations such as marine loading and unloading operations would include, but not be limited to: petroleum materials in the gasoline group, the benzene group and in special groups as follows: Gasoline Group-Diesel, Gas Oil, Gasoline, Kerosene, No. 2 Oil, No. 6 Oil, Pyrolysis Gasoline, Naphtha, Aviation Gasoline, Raffinate, Alkylate, and Resid; Benzene Group Benzene, Toluene, Ethylbenzene, p-Xylene, m-Xylene, Mixed Xylenes, Cumene, and Pseudocumene; Special - MTBE (methyl-tertiary-butylether), ETBE (ethyl-tertiary-butyl-ether), TAME (tertiary-amyl-methyl-ether), Pentane, and Hexane.

Generally, the off-gases derived from such petroleum transfer operations are comprised of oxygen, nitrogen, water and a light hydrocarbon fraction such as a $C_4+$ fraction ranging generally from about $C_4$ to $C_9$ hydrocarbons, and which hydrocarbons usually represent varying amounts, but typically from about 10-70%, e.g. 15 to 60% by volume of the off-gases, and generally having a boiling point of less than about 300° F.

The heavy hydrocarbon fraction of the heavy oil is employed both as motive fluid in the liquid ring compressor and as an absorbent fluid in the refrigerated absorbent column and may vary in composition, but generally the heavy hydrocarbon fractions have boiling points greater than about 275° F., for example, 275°-500° F., and have a mean boiling point of about 340°-400° F., with the heavy hydrocarbon fractions comprising primarily fractions of greater than $C_9+$, for example $C_9-C_{20}$ hydrocarbons. In the process, a liquid ring compressor is employed to compress the off-gases containing the light hydrocarbon fractions, which liquid ring compressor employs as a motive fluid a heavy hydrocarbon fraction or a heavy oil to provide for the absorption of light hydrocarbon fractions in the liquid ring compressor. The liquid ring compressor has an inlet and outlet, the inlet derived to receive off-gases containing the light hydrocarbon fraction and the outlet to discharge a vapor and liquid effluent mixture into a separator to provide for a vapor from the separator, which is reduced in the light hydrocarbon fraction and an effluent liquid, the majority portion of which is recycled into the inlet of the liquid ring compressor, while the vapor with the reduced hydrocarbon fraction is then introduced into the middle to lower portion of the refrigerated absorbent column.

In the process, a refrigerated absorbent column containing mass transfer devices is employed, and typically such column operates at a temperature of about 60° F. or less, generally at a pressure ranging from 20-30 psia with the vapor containing the light hydrocarbon fraction introduced into the lower portion of the refrigerated absorbent column. The heavy hydrocarbon fraction is introduced into the refrigerated absorbent column either at the upper portion of the column, for example, the top five or ten trays where a tray-type distillation column is employed, or it may be introduced into the overhead condenser, or into both, to provide an absorbent liquid for the light hydrocarbon fraction of the vapor in the refrigerated absorption column.

In the integrated process wherein a recovery column is employed, the recovery column operates at an overhead temperature from about 60° to 120° F., for example, with a pressure ranging from about 25 to 35 psia, and operates with a bottom temperature from about 350° to 450° F. The light hydrocarbon fraction is recovered in the upper portion of the column and a non-condensible vent stream is recycled into the inlet of the liquid ring compressor, and the bottom product stream, comprising a heavy hydrocarbon fraction, is removed, and the heavy oil purged or recycled for use in the refrigerated absorber column or as the liquid motive fluid in the liquid ring compressor.

The process of the invention employing the refrigerated absorption column system alone or the integrated process which includes the recovery column provides for an improved, efficient process for the recovery of light hydrocarbon fractions from off-gases and for the discharge of off-gasses into the atmosphere which have an environmentally safe hydrocarbon content.

The invention will be described for the purposes of illustration only in connection with certain embodiments, however it is recognized that various changes, modifications, additions and improvements may be made to the illustrated embodiments by those people skilled in the art, all falling within the spirit and scope of the invention.

DESCRIPTION OF THE EMBODIMENTS

Figure 1:
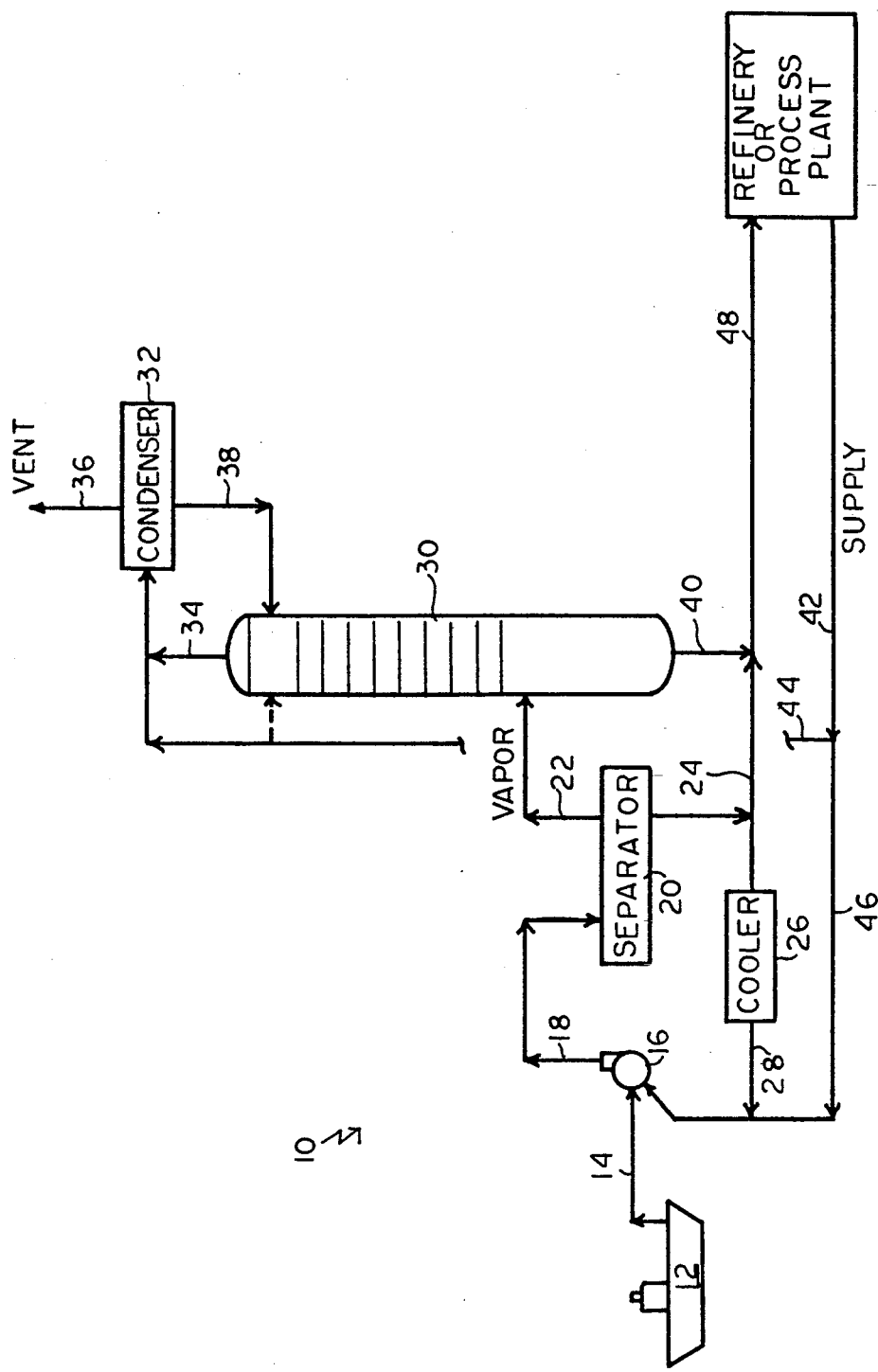
FIG. 1 is an illustrative schematic diagram of an absorption system for the recovery of light hydrocarbon fractions from off-gases from a petroleum transfer operation.

FIG. 1 is a schematic illustrated representation of a method for the recovery of a hydrocarbon fraction from marine loading operations employing a separate source of heavy hydrocarbon fractions, such as a refinery or process plant, which process comprises a marine vessel 12 with a discharge of off-gases containing a light hydrocarbon fraction to be recovered through line 14 directed into the inlet of a liquid ring compressor 16, the inlet typically operated at a suction pressure of about 5-12 psia, and at ambient temperature of about 60°-80° F., and the compressor 16 having a heavy hydrocarbon fraction as the motive fluid to seal the liquid ring compressor and to absorb light hydrocarbon fractions. The vapor-liquid mixture is removed from the outlet of the liquid ring compressor 16 at a pressure of about 17-30 psia through line 18 and introduced into a vapor-liquid separator 20, typically at a temperature ranging from about 100°-150° F. with a vapor feed withdrawn through line 22 and introduced into a refrigerated absorption column 30, operated at a temperature of 45°-60° F. such as, for example, 60° F. at 25 psia. An overhead stream is removed from the absorbent column 30 through line 34, typically at a temperature of 45°-60° F., and passed through a refrigerated condenser 32, at a temperature of 40°-65° F., the resulting liquid is recycled through line 38 back into the upper portion of the absorber column 30, while oxygen, and nitrogen with hydrocarbons under 1 percent of total contents are discharged in the atmosphere through vent line 36.

A heavy hydrocarbon fraction is introduced from a refinery or process plant or other source through line 42 and through line 44 is directed into the refrigerated overhead condenser 32 of the absorber column 30 or optionally as indicated by a dotted line into the upper portion of column 30, to absorb the light hydrocarbon fraction. A bottom stream containing the heavy hydrocarbon fraction and the recovered light hydrocarbon fraction is removed from the bottom of the column through line 40 at a temperature of about 100°-125° F. with the heavy hydrocarbon fraction and the light hydrocarbon fraction returned through line 48 to a refinery or process plant for further treatment or recovery.

A portion of the heavy hydrocarbon fraction is recycled from line 42 through line 46 and then introduced into the inlet of the liquid ring compressor 16, to replenish and maintain the motive fluid in the liquid ring compressor 16. A portion of the separator liquid stream is introduced through a cooler 26 operated at 80°–120° F. and through line 28 into the liquid ring compressor 16 as required. The process as described and illustrated provides for the effective and efficient recovery of a light hydrocarbon fraction for marine off-gases and provides for the discharge into the atmosphere of vapor with a total low hydrocarbon content.

Figure 2:
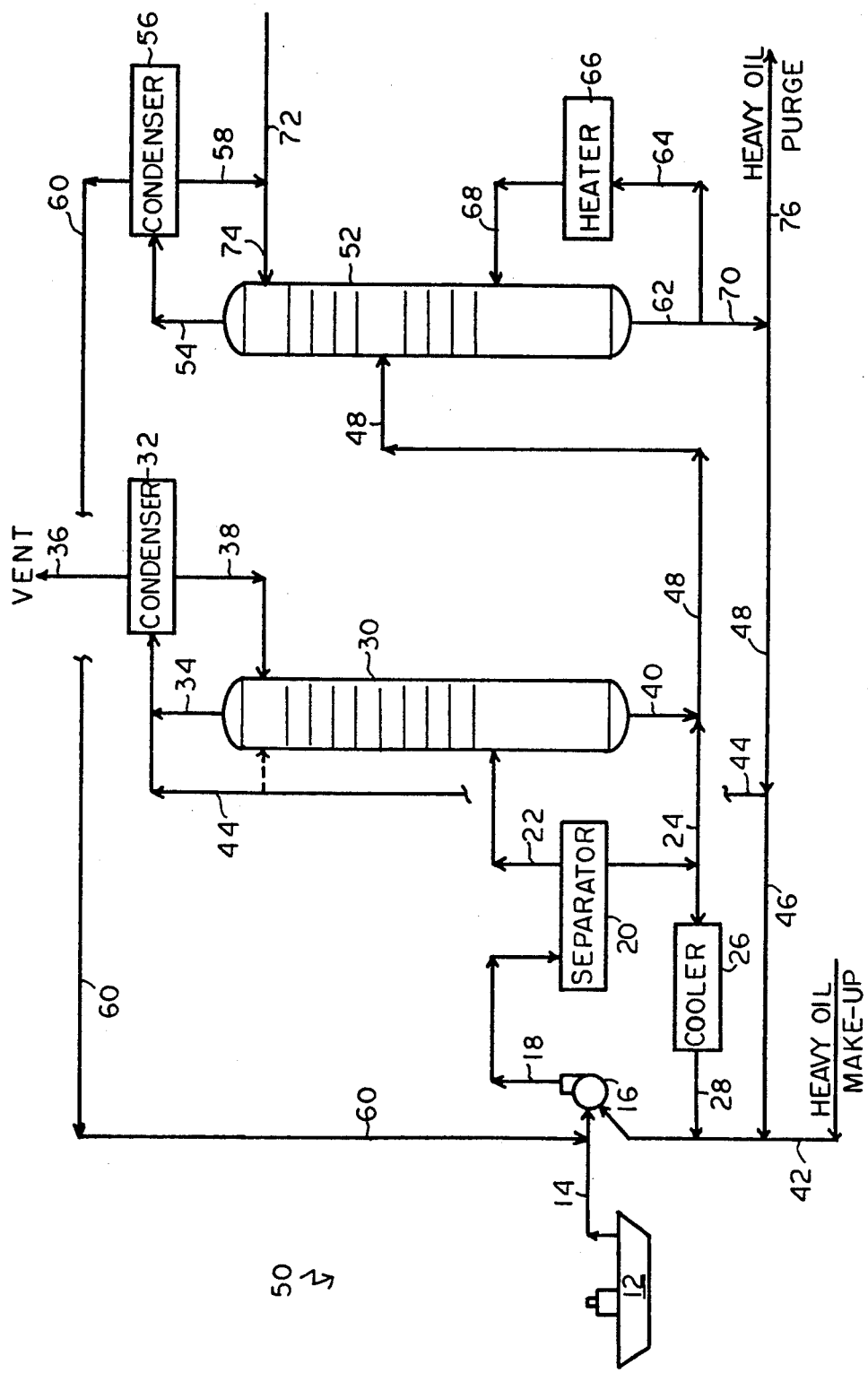
FIG. 2 is an integrated illustrated schematic diagram of an absorption recovery system for the recovery of a light hydrocarbon fraction from off-gases derived from marine transfer operation and the recycle of a heavy hydrocarbon fraction.

FIG. 2 is a schematic illustrated diagram of an integrated process of the recovery of light hydrocarbon fraction from marine off-gases. The process includes a stripper or recovery column 52, for example, operated with a bottom temperature of 350°–425° F., into which recovery column 52 a liquid feed stream 48 is introduced. Said feed comprising bottom liquid from the absorber column 30 through line 40 and purge liquid from the separator 20 through line 24. An overhead vapor stream of a light hydrocarbon fraction is removed through the overhead line 54 and introduced into a condenser 56, operated at 60°–120° F., reflux liquid is recycled through line 74 into the top of the stripper recovery column 15, while a portion of the light hydrocarbon fraction is withdrawn and recovered through line 72. An overhead non-condensible stream is removed through line 60 and recycled directly into the line 14 for recycling into the inlet of the liquid ring compressor 16.

A liquid bottom stream is removed through line 62 from the bottom of the stripper recovery column 52 and recycled by line 64 through a reboiler or heater 66, typically operated at 350°–425° F. and recycled through line 68 into the bottom portion of the recovery column 52. A minor portion of the liquid bottom stream 70 from the recovery column 52 is removed as a heavy oil purge stream through line 76, which may be returned to the refinery or processing plant, typically at a temperature of 100°–120° F. A portion thereof may be recycled through line 48 back into the absorber column 30 and the liquid ring compressor 16. A heavy oil makeup stream, such as a heavy hydrocarbon fraction stream may be introduced through line 42 to make up for heavy oil or heavy hydrocarbon fractions lost through the heavy oil purge stream 76. The process thus described is an integrated process which provides for the recycling of the heavy hydrocarbon fraction, the recovery of the light hydrocarbon fraction, and the discharge of vent gases having a low hydrocarbon content into the atmosphere.

Computer simulation of the process as illustrated in FIGS. 1 and 2 are shown respectively in Tables I and II. The software simulation computer program employed was Process SM, simulation program from Simulation Sciences Inc., of Fullerton, Calif., Version 4.01.

TABLE I

MATERIAL BALANCE: ABSORBER COLUMN SYSTEM

| COMPONENT | 14 FEED LBMOL/HR | 22 SEPARATOR VAPOR LBMOL/HR | 24 SEPARATOR PURGE LIQUID LBMOL/HR | 28 SEPARATOR CIRCULATION LIQUID LBMOL/HR | 36 SYSTEM VENT LBMOL/HR | 40 ABSORBER BOTTOMS LIQUID LBMOL/HR | 48 HEAVY OIL RETURN LBMOL/HR | 44 ABSORBER HEAVY OIL LBMOL/HR | 46 LIQUID RING HEAVY OIL LBMOL/HR | 42 HEAVY OIL SUPPLY LBMOL/HR |
|---|---|---|---|---|---|---|---|---|---|---|
| 1 AIR | 155.982 | 155.653 | 0.329 | 0.660 | 154.770 | 0.883 | 1.212 | 0.000 | 0.000 | 0.000 |
| 2 BUTANES | 100.760 | 83.415 | 17.345 | 34.797 | 0.163 | 83.252 | 100.597 | 0.000 | 0.000 | 0.000 |
| 3 PENTANES | 88.758 | 59.289 | 29.469 | 59.120 | 0.000 | 59.289 | 88.758 | 0.000 | 0.000 | 0.000 |
| 4 BENZENE | 18.771 | 6.185 | 12.586 | 25.249 | 0.000 | 6.185 | 18.771 | 0.000 | 0.000 | 0.000 |
| 5 HEXANES | 24.744 | 15.434 | 9.311 | 18.678 | 0.000 | 15.434 | 24.744 | 0.000 | 0.000 | 0.000 |
| 6 NBP 100–150 F. | 35.268 | 17.692 | 17.576 | 35.260 | 0.000 | 17.692 | 35.268 | 0.000 | 0.000 | 0.000 |
| 7 NBP 150–200 F. | 19.216 | 5.665 | 13.550 | 27.184 | 0.000 | 5.665 | 19.215 | 0.000 | 0.000 | 0.000 |
| 8 NBP 200–250 F. | 9.260 | 1.468 | 7.793 | 15.634 | 0.000 | 1.468 | 9.261 | 0.000 | 0.000 | 0.000 |
| 9 NBP 250–300 F. | 1.804 | 0.887 | 16.804 | 33.712 | 0.072 | 64.355 | 81.159 | 63.540 | 15.885 | 79.425 |
| 10 NBP 300–350 F. | 0.534 | 2.529 | 105.415 | 211.480 | 0.179 | 431.997 | 537.411 | 429.647 | 107.412 | 537.058 |
| 11 NBP 350–400 F. | 0.192 | 0.197 | 17.845 | 35.800 | 0.011 | 71.585 | 89.430 | 71.399 | 17.850 | 89.249 |
| 12 NBP 400+ F. | 0.032 | 0.008 | 3.899 | 7.822 | 0.000 | 15.508 | 19.407 | 15.500 | 3.875 | 19.375 |
|  | 455.321 | 348.421 | 251.921 | 505.396 | 155.195 | 773.311 | 1025.233 | 580.086 | 145.021 | 725.107 |
| TEMPERATURE, F. | 110 | 149 | 149 | 90 | 60 | 121 | 90 | 90 | 90 | 90 |
| PRESSURE, PSIA | 11 | 30 | 30 | 25 | 17 | 23 | 50 | 50 | 50 | 50 |
| VAPOR, MSCFH | 172.8 | 132.2 | — | — | 58.9 | — | — | — | — | — |
| LIQUID, GPM | — | — | 74.8 | 150.0 | — | 242.4 | 317.2 | 200.0 | 40.0 | 250.0 |

|  | PERCENT REMOVAL |
|---|---|
| BUTANES | 99.838 |
| PENTANES | 100.000 |
| BENZENE | 100.000 |
| HEXANES | 100.000 |
| NBP 100+ F. | 99.604 |

TABLE II

MATERIAL BALANCE: ABSORBER COLUMN AND RECOVERY COLUMN SYSTEMS

| COMPONENT | 14 FEED LBMOL/HR | 22 SEPARATOR VAPOR LBMOL/HR | LINE 24 SEPARATOR PURGE LIQUID LBMOL/HR | 28 SEPARTOR CIRCULATION LIQUID LBMOL/HR | 36 SYSTEM VENT LBMOL/HR | 40 ABSORBER BOTTOMS LIQUID LBMOL/HR |
|---|---|---|---|---|---|---|
| 1 AIR | 155.982 | 156.288 | 0.327 | 0.659 | 155.413 | 0.875 |
| 2 BUTANES | 100.760 | 84.121 | 17.333 | 34.959 | 0.245 | 83.875 |
| 3 PENTANES | 88.758 | 59.611 | 29.369 | 59.234 | 0.000 | 59.611 |
| 4 BENZENE | 18.771 | 6.227 | 12.571 | 25.354 | 0.002 | 6.305 |
| 5 HEXANES | 24.744 | 15.515 | 9.279 | 18.715 | 0.000 | 15.515 |
| 6 NBP 100-150 F. | 35.268 | 17.789 | 17.523 | 35.342 | 0.000 | 17.791 |
| 7 NBP 150-200 F. | 19.216 | 5.721 | 13.582 | 27.394 | 0.006 | 6.108 |
| 8 NBP 200-250 F. | 9.260 | 2.491 | 14.587 | 29.421 | 0.178 | 41.454 |
| 9 NBP 250-300 F. | 1.804 | 1.175 | 20.907 | 42.167 | 0.108 | 86.549 |
| 10 NBP 300-350 F. | 0.534 | 2.320 | 95.834 | 193.290 | 0.159 | 382.822 |
| 11 NBP 350-400 F. | 0.192 | 0.183 | 16.615 | 33.510 | 0.010 | 65.347 |
| 12 NBP 400+ F. | 0.032 | 0.008 | 3.598 | 7.256 | 0.000 | 13.998 |
|  | 455.321 | 351.446 | 251.523 | 507.302 | 156.120 | 780.249 |
| TEMPERATURE, F. | 110 | 149 | 149 | 90 | 60 | 121 |
| PRESSURE, PSIA | 11 | 30 | 30 | 25 | 17 | 23 |
| VAPOR, MSCFH | 172.8 | 133.4 | — | — | 59.2 | — |
| LIQUID, GPM | — | — | 74.4 | 150.0 | — | 243.0 |

| COMPONENT | 60 RECOVERY RECYCLE VAPOR LBMOL/HR | 72 RECOVERED LIGHTS LBMOL/HR | LINE 76 HEAVY OIL PURGE LBMOL/HR | 44 ABSORBER RECYCLE HEAVY OIL LBMOL/HR | 46 LIQUID RING RECYCLE HEAVY OIL LBMOL/HR | 42 HEAVY OIL MAKEUP LBMOL/HR |
|---|---|---|---|---|---|---|
| 1 AIR | 0.633 | 0.569 | 0.000 | 0.000 | 0.000 | 0.000 |
| 2 BUTANES | 0.694 | 100.515 | 0.000 | 0.000 | 0.000 | 0.000 |
| 3 PENTANES | 0.221 | 88.758 | 0.000 | 0.000 | 0.000 | 0.000 |
| 4 BENZENE | 0.010 | 18.765 | 0.005 | 0.080 | 0.016 | 0.000 |
| 5 HEXANES | 0.050 | 24.744 | 0.000 | 0.000 | 0.000 | 0.000 |
| 6 NBP 100-150 F. | 0.043 | 35.268 | 0.000 | 0.002 | 0.000 | 0.000 |
| 7 NBP 150-200 F. | 0.008 | 19.188 | 0.023 | 0.393 | 0.079 | 0.000 |
| 8 NBP 200-250 F. | 0.001 | 6.624 | 2.266 | 39.280 | 7.856 | 0.000 |
| 9 NBP 250-300 F. | 0.000 | 0.019 | 4.928 | 85.428 | 17.086 | 3.177 |
| 10 NBP 300-350 F. | 0.000 | 0.000 | 21.955 | 380.590 | 76.118 | 21.482 |
| 11 NBP 350-400 F. | 0.000 | 0.000 | 3.759 | 65.169 | 13.034 | 3.570 |
| 12 NBP 400+ F. | 0.000 | 0.000 | 0.807 | 13.990 | 2.798 | 0.775 |
|  | 1.661 | 294.450 | 33.743 | 584.932 | 116.986 | 29.004 |
| TEMPERATURE, F. | 90 | 90 | 90 | 90 | 90 | 90 |
| PRESSURE, PSIA | 38 | 38 | 50 | 50 | 50 | 50 |
| VAPOR, MSCFH | 0.6 | — | — | — | — | — |
| LIQUID, GPM | — | 65.6 | 11.5 | 200.0 | 40.0 | 10.0 |

|  | PERCENT REMOVAL |
|---|---|
| BUTANES | 99.756 |
| PENTANES | 100.000 |
| BENZENE | 99.990 |
| HEXANES | 100.000 |
| NBP 100+ F. | 99.306 |

What is claimed is:

1. A process for the recovery of light hydrocarbon fractions from off-gases derived from the transfer of petroleum materials which process comprises:
   a) introducing off-gases containing light hydrocarbon fractions derived from the transfer of petroleum materials into a liquid-ring compressor employing a heavy hydrocarbon fraction as the motive fluid in the liquid ring compressor to seal the compressor and to absorb a light hydrocarbon fraction;
   b) withdrawing a vapor-liquid effluent mixture from the liquid ring compressor;
   c) separating the vapor from the liquid effluent of the vapor-liquid effluent mixture, the vapor reduced in the light hydrocarbon fraction to be recovered;
   d) recirculating a portion of the separated liquid effluent to the liquid-ring compressor;
   e) introducing the separated vapor with the reduced light hydrocarbon fractions into a lower portion of a refrigerated absorber column containing mass transfer devices;
   f) introducing a heavy hydrocarbon fraction into an overhead condenser or the upper portion of the refrigerated absorber column for the absorption of the light hydrocarbon fractions from said separated vapor;
   g) discharging from said refrigerated absorber column an overhead vapor stream which is reduced in total hydrocarbon content and substantially environmentally acceptable for atmospheric discharge; and
   h) withdrawing from said refrigerated absorber column a bottoms stream which comprises the heavy hydrocarbon fraction and the recovered light hydrocarbon fractions.

2. The process of claim 1 wherein the off-gases comprise air or nitrogen with a light hydrocarbon fraction of from about 10 to 70 percent by volume.

3. The process of claim 1 wherein the light hydrocarbon fractions have boiling points of less than about 300 degrees Fahrenheit.

4. The process of claim 1 wherein the light hydrocarbon fractions comprise $C_4$–$C_9$ hydrocarbons.

5. The process of claim 1 wherein the heavy hydrocarbon fractions have boiling points of greater than about 275 degrees Fahrenheit.

6. The process of claim 5 wherein the heavy hydrocarbon fraction has a boiling point range of about 275 to 500 degrees Fahrenheit and a mean boiling point of about 340 to 400 degrees Fahrenheit.

7. The process of claim 1 wherein the heavy hydrocarbon fractions comprise primarily $C_9$–$C_{20}$ hydrocarbons.

8. The process of claim 1 wherein said refrigerated column is operated at a temperature of about 60 degrees Fahrenheit or less with a pressure of about 20–30 psia.

9. The process of claim 1 wherein the refrigerated column contains either distillation-type trays, loose distillation-type packing, or structured distillation-type packing.

10. The process of claim 1 wherein the overhead vapor stream comprises less than about 1 percent by volume total hydrocarbon content.

11. The process of claim 1 which includes separating the bottom stream into a light hydrocarbon fraction and a heavy hydrocarbon fraction; recovering the light hydrocarbon fractions, and recycling the heavy hydrocarbons fraction to said refrigerated column.

12. The process of claim 1 wherein the off-gases are derived from the transfer of petroleum materials from a marine transfer operation.

13. The process of claim 1 which includes:
  a) introducing the absorber bottom stream and the separator purge stream into a recovery distillation column;
  b) withdrawing a light hydrocarbon overhead stream from said recovery column;
  c) withdrawing a non-condensibles vent stream from said recovery column and recycling the vent stream to the liquid-ring compressor; and
  d) withdrawing a heavy hydrocarbon bottoms stream essentially free of the light hydrocarbon fraction and adapted for recycle use to the liquid-ring compressor and refrigerated absorber column.

14. The process of claim 13 wherein the recovery column operates at an overhead temperature of from about 60 to 120 degrees Fahrenheit.

15. The process of claim 13 wherein the recovery column operates with a bottoms temperature of from about 350 to 450 degrees Fahrenheit.

16. The process of claim 13 wherein a heavy hydrocarbon purge stream is withdrawn from the recovery column bottoms.

17. A recycle process for the recovery of a light hydrocarbon fraction from the off-gases derived from the transfer of petroleum materials, which process comprises:
  a) introducing off-gases containing a light hydrocarbon fraction and derived from the transfer of a petroleum material in a marine transfer operation into a liquid-ring compressor employing a heavy hydrocarbon as the motive fluid;
  b) separating the vapor and liquid effluent of said liquid-ring compressor, withdrawing a portion of the liquid effluent, and recirculating the bulk of the liquid effluent to the liquid-ring compressor;
  c) introducing the separated vapor into the lower portion of a refrigerated absorber column containing mass transfer devices;
  d) introducing a heavy hydrocarbon fraction into an overhead condenser and/or the upper portion of said absorber column for the absorption of the light hydrocarbon fraction from said vapor stream;
  e) withdrawing from said absorber column an overhead vapor stream which is reduced in total hydrocarbon content and environmentally acceptable for atmospheric disposal;
  f) withdrawing from said absorber column a bottoms stream composed of the heavy hydrocarbon fraction and the recovered light hydrocarbon fraction;
  g) introducing the bottoms stream and the separator purge stream into a recovery distillation column;
  h) withdrawing a light hydrocarbon fraction as an overhead stream from said recovery column;
  i) withdrawing a non-condensibles vent stream from said recovery column and recycling the vent stream to the liquid-ring compressor; and
  j) withdrawing a heavy hydrocarbon fraction bottoms stream essentially free of a light hydrocarbon fraction and adapted for recycle use to the liquid-ring compressor and absorber column.

* * * * *